US011729505B2

(12) United States Patent
Jung et al.

(10) Patent No.: US 11,729,505 B2
(45) Date of Patent: Aug. 15, 2023

(54) IMAGE SIGNAL PROCESSOR, ELECTRONIC DEVICE, AND IMAGE STABILIZATION METHOD

(71) Applicant: SAMSUNG ELECTRONICS CO., LTD., Suwon-si (KR)

(72) Inventors: Hye Yun Jung, Seoul (KR); Jae Won Choi, Yongin-si (KR); Seung Won Choi, Hwaseong-si (KR); Yeong Min Lee, Hwaseong-si (KR)

(73) Assignee: SAMSUNG ELECTRONICS CO., LTD.

( * ) Notice: Subject to any disclaimer, the term of this patent is extended or adjusted under 35 U.S.C. 154(b) by 62 days.

(21) Appl. No.: 17/535,924

(22) Filed: Nov. 26, 2021

(65) Prior Publication Data
US 2022/0385816 A1 Dec. 1, 2022

(30) Foreign Application Priority Data

Feb. 10, 2021 (KR) .................. 10-2021-0019243
Jun. 9, 2021 (KR) .................. 10-2021-0074784

(51) Int. Cl.
H04N 23/68 (2023.01)
G06T 7/20 (2017.01)
(Continued)

(52) U.S. Cl.
CPC .......... *H04N 23/683* (2023.01); *G06T 7/20* (2013.01); *H04N 23/6811* (2023.01);
(Continued)

(58) Field of Classification Search
CPC ............ H04N 23/683; H04N 23/6811; H04N 23/6812; H04N 23/80; H04N 23/687; H04N 25/60; G06T 7/20; G06T 2207/20224
See application file for complete search history.

(56) References Cited

U.S. PATENT DOCUMENTS 8,531,504 B2  9/2013 Nestares et al.
8,896,713 B2  11/2014 Corey et al.
(Continued)

FOREIGN PATENT DOCUMENTS

CN         106331480 A         1/2017

Primary Examiner — Christopher K Peterson
(74) Attorney, Agent, or Firm — Fish & Richardson P.C.

(57) ABSTRACT

An electronic device comprises a camera module and an image signal processor. The camera module generates and outputs gyro data and frame data for an input image. The image signal processor comprises a motion vector module which calculates motion vector information, a gyro-based motion estimator which extracts camera rotation information of the camera module from the gyro data, a motion vector-based motion estimator which extracts frame rotation information from the frame data, an optical image stabilization (OIS) two-dimensional (2D) translation information estimator which estimates OIS 2D translation information based on the motion vector information, the camera rotation information, and the frame rotation information, and a camera path optimizer which filters out a low-frequency component from the OIS 2D translation information and calculates stabilized camera motion information of the camera module using the filtered OIS 2D translation information and the camera rotation information.

20 Claims, 8 Drawing Sheets

(51) Int. Cl.
*H04N 23/80* (2023.01)
*H04N 25/60* (2023.01)

(52) U.S. Cl.
CPC ......... *H04N 23/6812* (2023.01); *H04N 23/80* (2023.01); *G06T 2207/20224* (2013.01)

(56) References Cited

U.S. PATENT DOCUMENTS

| | | |
|---|---|---|
| 9,596,411 B2 | 3/2017 | Thivent et al. |
| 10,674,086 B2 | 6/2020 | Wang et al. |
| 10,740,431 B2 | 8/2020 | Zhuang et al. |
| 2014/0267809 A1* | 9/2014 | Tsubaki ............... H04N 23/687 348/208.6 |
| 2015/0326785 A1* | 11/2015 | Tsubaki ................ H04N 23/68 348/208.2 |
| 2019/0058821 A1* | 2/2019 | Lee ...................... H04N 23/671 |
| 2021/0258490 A1* | 8/2021 | Saito .................. H04N 23/6812 |

* cited by examiner

FIG. 5

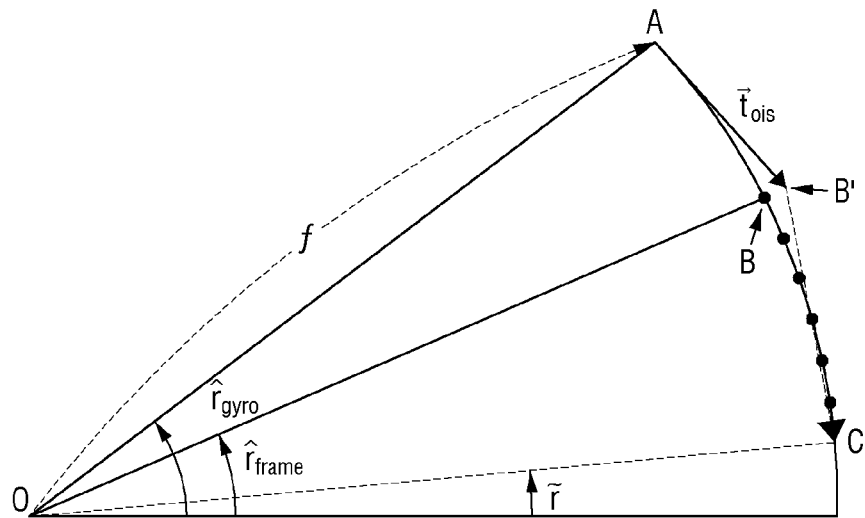

$f$ : effective focal length(pixel)
A: body position before EIS
B: frame(lens) rotation position before EIS
B': actual frame(lens) position before EIS
C: desired body position
$\tilde{r}_{gyro}$: rotation angle of body before EIS
$\tilde{r}_{frame}$ : rotation angle of camera(lens) before EIS
$\tilde{r}$ : rotation angle of body after EIS
$\vec{t}_{ois}$ : translation motion of frame(lens)

IMAGE SIGNAL PROCESSOR, ELECTRONIC DEVICE, AND IMAGE STABILIZATION METHOD

This U.S. non-provisional patent application claims the benefit of priority under 35 U.S.C. § 119 to Korean Patent Application No. 10-2021-0019243, filed on Feb. 10, 2021 in the Korean Intellectual Property Office, and to Korean Patent Application No. 10-2021-0074784, filed on Jun. 9, 2021 in the Korean Intellectual Property Office, the disclosures of which are incorporated herein in their entirety by reference.

BACKGROUND

1. Field

The present disclosure relates to image stabilization.

2. Description of the Related Art

If a problem such as a user's handshake occurs while an electronic device is capturing an image, the image may be obtained in a distorted state. To compensate for the user's handshake problem, the electronic device may perform image correction. Image correction may include, for example, optical image stabilization (OIS) correction or digital image stabilization (DIS) or electrical image stabilization (EIS) correction.

In the OIS correction, if the electronic device shakes while a camera module is obtaining an image, an image stabilizer may move a lens or an image sensor to compensate for the shaking of the electronic device. There are two types of OIS correction: a shift method related to movement in a plane and a tilt method related to rotation. In addition, each of the OIS correction methods may include, for example, a lens moving method (a method of moving a lens) or a sensor moving method (a method of moving a sensor). The OIS correction may involve two-dimensional (2D) image translation using OIS 2D translation information.

In the DIS or EIS correction, the electronic device may correct an image based on at least one of image motion and gyro data. The image motion may refer to frame data indicating the movement of an object (e.g., feature points of a captured subject) within a frame image. The electronic device may determine the image motion by comparing frame images obtained through the camera module. The gyro data may refer to information corresponding to the shaking of the electronic device. The gyro data may be obtained through a motion sensor that senses the shaking of the electronic device. That is, the gyro data may represent three-dimensional (3D) rotation.

In many cases, although the electronic device shakes three-dimensionally, the camera module senses only gyro data, frame data and motion vector information. An electronic device that does not provide OIS 2D translation information has to perform digital image stabilization using only camera module rotation information and frame rotation information processed from information sensed by the camera module, i.e., the gyro data, the frame data and the motion vector information.

If an electronic device using a shift optical image stabilizer performs digital image stabilization using only the camera module rotation information and the frame rotation information, wobbling may appear in a final processed image because the stabilization is performed without reflecting OIS 2D translation information obtained when an object is captured.

SUMMARY

According to an aspect of the present disclosure, an electronic device comprises a camera module and an image signal processor. The camera module generates and outputs gyro data and frame data for an input image. The image signal processor comprises a motion vector module, a gyro-based motion estimator, a motion vector-based motion estimator, an optical image stabilization (OIS) two-dimensional (2D) translation information estimator, and a camera path optimizer. The motion vector module calculates motion vector information. The gyro-based motion estimator extracts camera rotation information of the camera module from the gyro data. The motion vector-based motion estimator extracts frame rotation information from the frame data. The optical image stabilization (OIS) two-dimensional (2D) translation information estimator estimates OIS 2D translation information based on the motion vector information, the camera rotation information, and the frame rotation information. The camera path optimizer filters out a low-frequency component from the OIS 2D translation information to produce filtered OIS 2D translation information, and calculates stabilized camera motion information of the camera module using the filtered OIS 2D translation information and the camera rotation information.

According to another aspect of the present disclosure, an electronic device comprises a camera module and an image signal processor. The camera module outputs gyro data comprising at least two gyro sensing values and frame data comprising at least two frame images. The image signal processor calculates camera rotation information and frame rotation information based on the gyro data, the frame data and motion vector information, estimates OIS 2D translation information based on the camera rotation information and the frame rotation information, estimates stabilized camera motion information of the camera module based on the estimated OIS 2D translation information, and compensates for final motion information calculated based on the stabilized camera motion information, the estimated OIS 2D translation information and the camera rotation information.

According to other aspect of the present disclosure, an image stabilization method of an electronic device includes sensing a frame image and obtaining gyro data, frame data and motion vectors according to shaking of the electronic device. The image stabilization method also includes extracting camera rotation information of the electronic device from the gyro data and extracting frame rotation information from the frame data and motion vectors, estimating raw OIS 2D translation information based on the camera rotation information and the frame rotation information, calculating filtered OIS 2D translation information by removing a bias component from the raw OIS 2D translation information; and performing digital image stabilization on the sensed frame image based on the filtered OIS 2D translation information.

The above and other aspects of the present disclosure will become more apparent to one of ordinary skill in the art to which the present disclosure pertains by referencing the detailed description of the present disclosure given below.

BRIEF DESCRIPTION OF THE DRAWINGS

These and/or other aspects will become apparent and more readily appreciated from the following description of the embodiments, taken in conjunction with the accompanying drawings in which:

FIG. 5 is a conceptual diagram for explaining an image stabilization method according to some embodiments of the present disclosure.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques may be omitted so as to not unnecessarily obscure the embodiments herein. The term "or" as used herein, may refer to non-exclusive alternatives, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein, and the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

As is traditional in the fields to which the present disclosure applies, embodiments may be described and illustrated in terms of blocks which carry out a described function or functions. These blocks, which may be referred to herein as stabilizers, modules, estimators or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Figure 1:
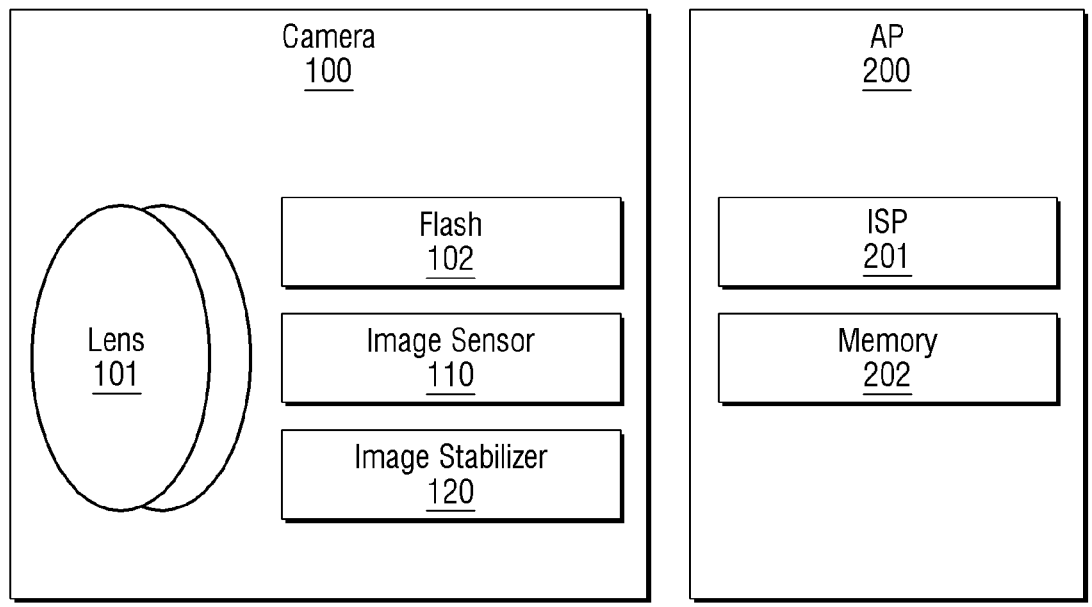
FIG. 1 is a block diagram illustrating an electronic device according to some embodiments of the present disclosure.

FIG. 1 is a block diagram illustrating an electronic device according to some embodiments of the present disclosure.

Referring to FIG. 1, the electronic device includes a camera module 100 and an application processor 200 (AP).

The camera module 100 may include a lens assembly 101, a flash 102, an image sensor 110 and an image stabilizer 120. The application processor 200 may include an image signal processor 201 and a memory 202 (e.g., a buffer memory).

The lens assembly 101 may collect light emitted from a subject to be captured in an image. The lens assembly 101 may include one or more lenses. According to an embodiment, the camera module 100 may include multiple instances of the lens assembly 101. In this case, the camera module 100 may be, for example, a dual camera, a 360-degree camera, or a spherical camera. Each instance of the lens assembly 101 may have the same lens attribute (e.g., angle of view, focal length, auto-focusing, f number, or optical zoom), or at least one instance of the lens assembly 101 may have one or more lens attributes different from those of other instances of the lens assembly 101. The lens assembly 101 may include, for example, a wide-angle lens or a telephoto lens.

The flash 102 may emit light that is used to reinforce light emitted from a subject. The flash 102 may include one or more light emitting diodes (LEDs) (e.g., red-green-blue (RGB) LEDs, white LEDs, infrared (IR) LEDs, or ultraviolet (UV) LEDs) or a xenon lamp.

The image sensor 110 may obtain an image corresponding to a subject by converting light received from the subject through the lens assembly 101 into an electrical signal. According to an embodiment, the image sensor 110 may include one image sensor selected from image sensors having different attributes, such as an RGB sensor, a black-and-white (BW) sensor, an IR sensor or a UV sensor, may include a plurality of image sensors having the same attribute, or may include a plurality of image sensors having different attributes. Each image sensor included in the image sensor 110 may be implemented as, for example, a charge coupled device (CCD) sensor or a complementary metal oxide semiconductor (CMOS) sensor.

The image stabilizer 120 may move at least one lens included in the lens assembly 101, or may move the image sensor 110 in a specific direction. The image stabilizer 120 may control the at least one lens or the image sensor 110, such as by adjusting read-out timing, in response to the movement of the camera module 100 or the electronic device including the camera module 100. The image stabilizer 120 may control the at least one lens or the image sensor 110 in order to at least partially compensate for a negative effect (e.g., image wobbling) of movement on an image being captured. According to an embodiment, the image stabilizer 120 may be implemented as, for example, an optical image stabilizer, and may sense the movement using a gyro sensor (not illustrated) or an acceleration sensor (not illustrated) disposed inside or outside the camera module 100.

The image signal processor 201 may perform image processing such as depth map generation, three-dimensional (3D) modeling, panorama generation, feature point extraction, and/or image synthesizing on an image obtained through the image sensor 110 or an image stored in the memory 202. The image signal processor 201 may perform image compensation such as noise reduction, resolution adjustment, brightness adjustment, blurring, sharpening or softening on an image obtained through the image sensor 110 or an image stored in the memory 202. Alternatively, the image signal processor 201 may perform control such as exposure time control or read-out timing control on at least one of the components (e.g., the image sensor 110) included in the camera module 100. A final image processed by the image signal processor 201 may be stored back in the memory 202 for further processing or may be sent to an external component outside the camera module 100. According to an embodiment, the image signal processor 201 may be configured as at least a part of the application processor 200 as illustrated in the FIG. 1. According to another embodiment, the image signal processor 201 may be configured as a separate processor that is operated independently of the application processor 200. When the image signal processor 201 is configured as a separate processor, final images processed by the image signal processor 201 may be displayed on a display device (see FIG. 12) before being processed by the application processor 200 or may be displayed after being further processed by the application processor 200.

According to an embodiment, the memory 202 may at least temporarily store at least a part of an image obtained through the image sensor 110 for a subsequent image processing operation. For example, if image capturing is delayed due to shutter lag or multiple images are captured at high speed, a raw image (e.g., a high-resolution image) may be stored in the memory (202), and a copy image (e.g., a low-resolution image) corresponding to the raw image may be previewed via the display device. Then, if a specified condition is met (e.g., by a user's input or system command), at least a part of the raw image stored in the memory 202 may be obtained and processed, for example, by the image signal processor 201. The memory 202 may be configured as at least a part of the application processor 200, or the memory 202 may be configured as a separate memory that is operated independently of the application processor 200.

Figure 12:
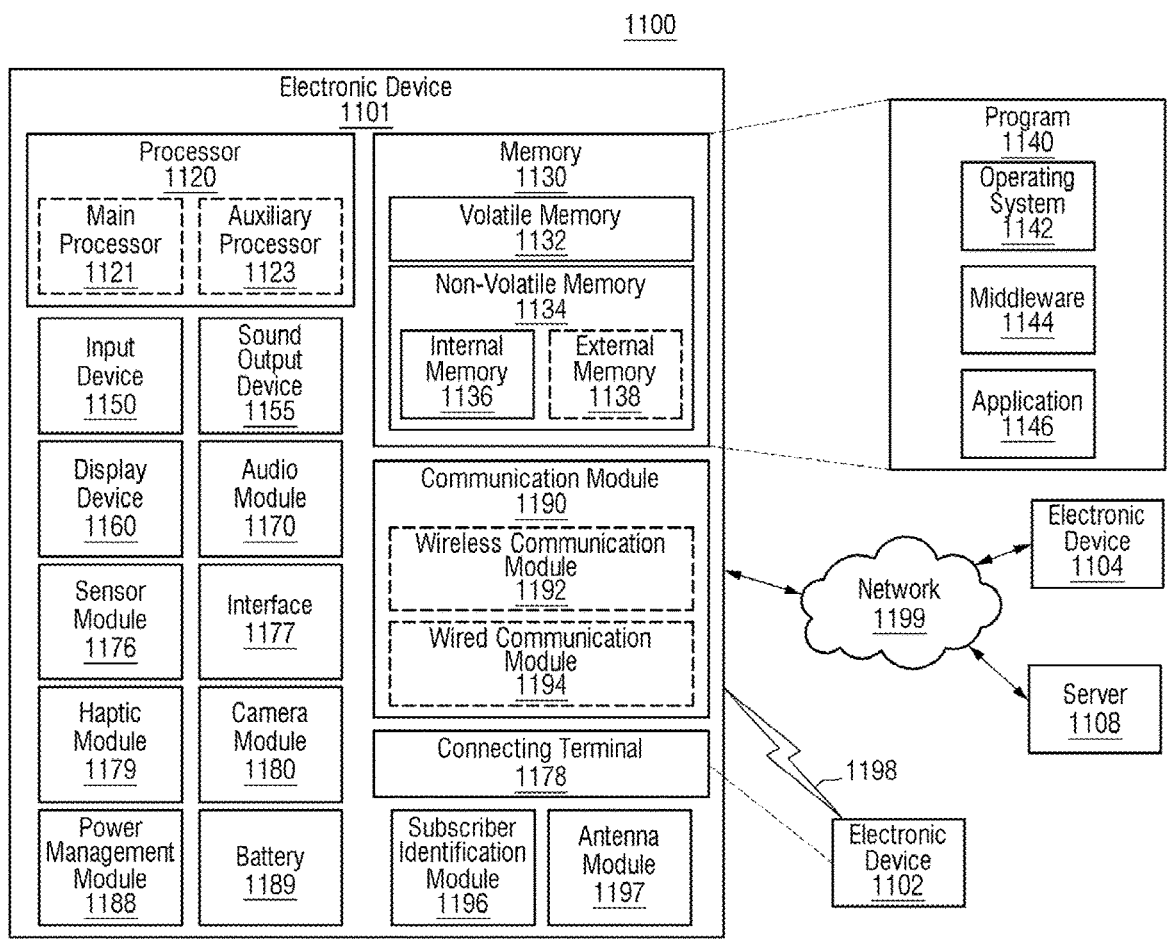
FIG. 12 is a block diagram illustrating an electronic device 1101 in a network environment 1100, according to some embodiments of the present disclosure.

According to an embodiment, the electronic device see FIG. 12) may include two or more instances of the camera module 100 having different attributes or functions. In this case, at least one of the instances of the camera module 100 may be, for example, a wide-angle camera or a front camera, and at least one other instance of the camera module 100 may be a telephoto camera or a rear camera.

Figure 2:
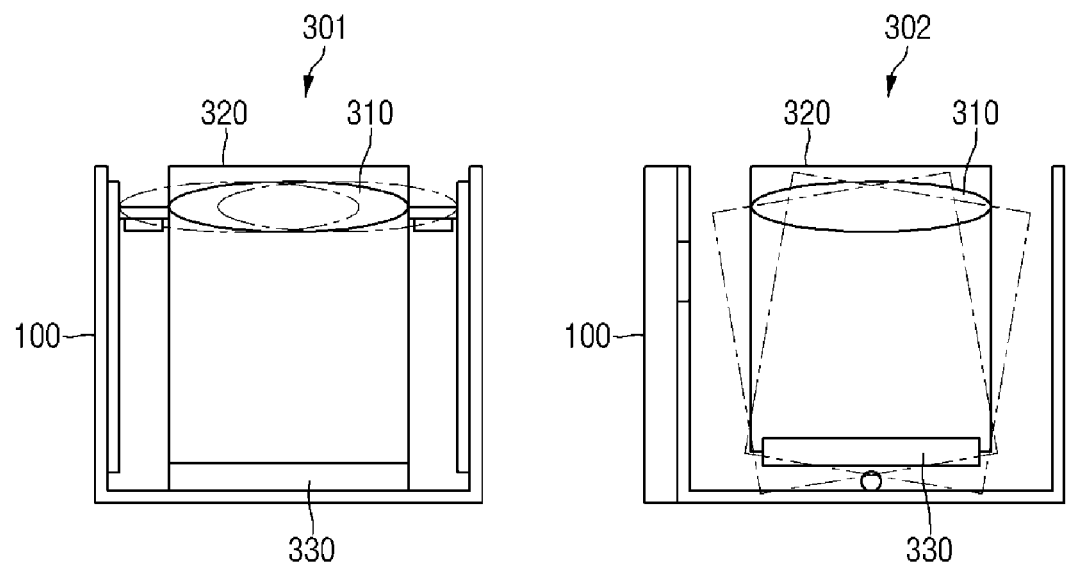
FIG. 2 is a diagram for explaining an optical image stabilization (OIS) correction operation according to some embodiments of the present disclosure.

FIG. 2 is a diagram for explaining an optical image stabilization (OIS) correction operation according to some embodiments of the present disclosure.

Referring to FIG. 2, an electronic device (see FIG. 12) may include a camera module 100. For example, the electronic device may further include a gyro sensor inside or outside the camera module 100. The gyro sensor senses shaking of the body of the electronic device. For another example, the electronic device may further include the image stabilizer 120 which controls the movement of at least one of a lens 310, an image sensor 330, and a camera module unit 320.

According to an embodiment, the camera module 100 may include the lens 310 (e.g., the lens assembly 101 of FIG. 1) and the image sensor 330 (e.g., the image sensor 110 of FIG. 1). The lens 310 may collect light reflected from a subject and send the light to the image sensor 330. The image sensor 330 may obtain an image by converting the light received from the lens 310 into an electrical signal.

According to an embodiment, if the electronic device shakes while obtaining an image, the electronic device (or the image stabilizer 120) may primarily perform OIS correction to compensate for the shaking of the electronic device. For example, the image stabilizer 120 may sense shaking of the camera module 100 through a sensor (e.g., a gyro sensor or an acceleration sensor) built in the camera module 100 and may control at least one of the components of the camera module 100 to physically move in response to the sensed shaking.

For example, referring to reference numeral 301 of FIG. 2, the image stabilizer 120 may perform OIS correction using a lens shift method in which the lens 310 moves. For another example, referring to reference numeral 302 of FIG. 2, the image stabilizer 120 may perform OIS correction using a module tilt method in which the camera module unit 320 including the lens 310 and the image sensor 330 moves. For another example, although not illustrated in FIG. 2, the image stabilizer 120 may perform OIS correction using a sensor shift method in which the image sensor 330 moves. When OIS correction is performed using a shift method in some embodiments, an image stabilization method will be described, focusing on a camera module operating using, for example, the lens shift method or the sensor shift method.

According to an embodiment, the electronic device may sense the movement of the electronic device using a motion sensor (e.g., a gyro sensor or an acceleration sensor) separate from a sensor used for OIS correction. In the following description, information corresponding to the movement of the electronic device may be referred to as gyro data, 3D rotation information, or camera rotation information C_Path. In addition, in this document, for OIS correction, information corresponding to the movement of the lens 310 or the image sensor 330 may be referred to as OIS motion data, two-dimensional (2D) motion information, or OIS 2D translation information T_Path. The camera rotation information C_Path or the OIS 2D translation information T_Path may be expressed as a change in angle over time or a change in relative position of the camera module unit 320 over time. In this case, the change in angle or the change in relative position of the camera module unit 320 over time may be the cumulative sum of a translation difference value of the camera module unit 320 for each frame.

Image motion is a result of simultaneously reflecting the camera rotation information C_Path and the OIS 2D translation information T_Path. However, the electronic device cannot obtain motion information from a frame image unless a sensor value obtained by sensing the movement of the camera module unit 320 of FIG. 2 is provided.

If the electronic device performs digital image stabilization correction on a frame image without considering the OIS 2D translation information T_Path, the image may be overcorrected as much as the OIS correction is performed. Therefore, according to various embodiments, the electronic device may perform digital image stabilization correction more accurately by estimating the OIS 2D translation information T_Path based on the camera rotation information C_Path and frame rotation information FR_Path and reflecting stabilized camera rotation information in motion correction in consideration of the estimated OIS 2D translation information T_Path.

In the following description, the movement of the camera module body will be referred to as the camera rotation information C_Path. Motion information by a lens shift or a sensor shift will be referred to as the OIS 2D translation information T_Path. Motion information based on frame data and motion vectors output from the camera module unit 320 will be referred to as the frame rotation information FR_Path.

Figure 3:
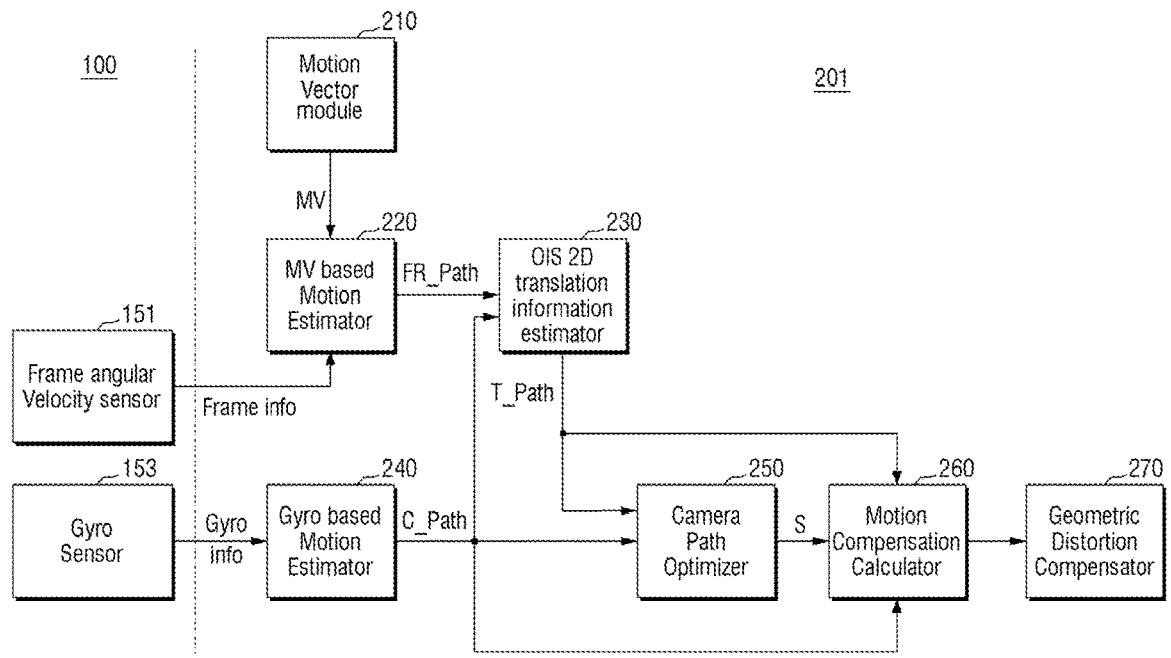
FIG. 3 is a block diagram illustrating an image signal processor 201 according to some embodiments of the present disclosure.

FIG. 3 is a block diagram illustrating an image signal processor 201 according to some embodiments of the present disclosure.

Referring to FIG. 3, a camera module 100 may include a frame angular velocity sensor 151 and a gyro sensor 153 according to some embodiments of the present disclosure.

The frame angular velocity sensor 151 outputs frame data (Frame info, for example, a frame timestamp and a captured frame image corresponding to the frame timestamp). The frame angular velocity sensor 151 is also called a frame sensor. Specifically, the frame angular velocity sensor 151 may output instantaneous angular velocity information of a frame image whenever a frame timestamp is taken at preset cycles. A motion vector module 210 may output position change information of feature points in a frame whenever a frame timestamp is taken. An image sensor 110 generates a frame image, and frame data generated by the frame angular velocity sensor 151 includes a frame timestamp and position information of feature points in the frame image.

The gyro sensor 153 outputs gyro data (Gyro info). Specifically, the gyro sensor 153 may output instantaneous angular velocity information of the camera module 100 itself, i.e., the body of the camera module 100 whenever a gyro timestamp is taken at preset cycles. That is, the gyro data includes a gyro timestamp and position information (e.g., 3D coordinates) of the camera body of the camera module 100.

According to some embodiments, the application processor 200 or the image signal processor 201 may include the motion vector module 210, a motion vector-based motion estimator 220, an OIS 2D translation information estimator 230, a gyro-based motion estimator 240, a camera path optimizer 250, a motion compensation calculator 260, and a geometric distortion compensator 270. For example, the application processor 200 or the image signal processor 201 may comprise a multi-core processor that distributes tasks to different cores which execute different processes to implement functions attributed to these elements.

The image signal processor 201 may receive the frame rotation information FR_Path and the camera rotation information C_Path processed from the frame data and/or motion data (e.g., information corresponding to the movement of the lens 310 or the image sensor 330) and the gyro data, and extract the OIS 2D translation information T_Path. Then, the image signal processor 201 may optimize the camera rotation information C_Path by reflecting the OIS 2D translation information T_Path and output a digitally stabilized final image through the optimized camera rotation information C_Path and the OIS 2D translation information T_Path.

In a raw image, according to the movement of a rolling shutter, each pixel within one frame image (e.g., a first frame generated at a first frame timestamp) is sensed at a different point in time depending on the position of the camera body for each line or the rotation angle of the frame, and position information of feature points of the same subject is changed. The motion vector-based motion estimator 220 may extract this change in pixel position information, that is, rolling shutter information. This is called the intra-frame frame rotation information Intra_FR_Path, and is extracted from one frame. In addition, final camera rotation information Final C Path info in each frame is extracted by cumulatively adding inter-frame frame rotation information Inter_FR_Path of the camera.

According to some embodiments, the motion vector module 210 receives the frame image and the frame data and extracts motion vector information MV of the frame image, that is, motion information of the frame. The motion vector information MV may be motion information extracted from a frame image. According to some embodiments, the motion vector-based motion estimator 220 extracts the frame rotation information FR_Path based on the frame data (Frame info) and/or the motion vector information MV. The frame rotation information FR_Path may include the inter-frame frame rotation information Inter_FR_Path, the intra-frame frame rotation information Intra_FR_Path, and final frame rotation information Final FR_Path obtained by cumulatively adding the inter-frame frame rotation information Inter_FR_Path.

Specifically, the motion vector-based motion estimator 220 extracts an angle change between 'first rotation information' of the first frame generated at the first frame timestamp and 'second rotation information' of a second frame generated at a second frame timestamp based on the frame data and the motion vector information MV received from the frame angular velocity sensor 151 and the motion vector module 210. Here, the extracted information is referred to as the inter-frame frame rotation information Inter_FR_Path. The final frame rotation information Final FR_Path in each frame is extracted by cumulatively adding the inter-frame frame rotation information Inter_FR_Path of the frame.

The gyro-based motion estimator 240 extracts the camera rotation information C_Path based on the gyro data. Specifically, the gyro-based motion estimator 240 may compare the gyro data, that is, 'first rotation information' generated at a first gyro timestamp and 'second rotation information' generated at a second gyro timestamp and extract a position change (e.g., including movement amount, movement direction, and rotation angular velocity on each of x-, y- and z-axes) in a 3D world coordinate system between the first gyro timestamp and the second gyro timestamp as the camera rotation information C_Path. The camera rotation information C_Path also includes inter-frame camera rotation information Inter_C_Path, intra-frame camera rotation information Intra_C_Path, and final camera rotation information Final C_Path. The final camera rotation information Final C_Path may be calculated by cumulatively adding the inter-frame camera rotation information Inter_C_Path.

The OIS 2D translation information estimator 230 extracts the OIS 2D translation information T_Path, which is information related to a lens shift or a sensor shift, based on the frame rotation information FR_Path and the camera rotation information C_Path. The OIS 2D translation information T_Path may be information about the movement of the lens 310 of the camera module 100 on the same plane (plane shift) or the movement of the image sensor 110 on the same plane.

The OIS 2D translation information T_Path may be obtained by, for example, multiplying a difference value (e.g., an angle value) between the camera rotation information C_Path and the frame rotation information FR_Path by a focal length of an image sensor or a lens. In this case, both inter-frame OIS 2D translation information Inter_T_Path and intra-frame OIS 2D translation information Intra_T_Path are obtained in the same manner (specifically, Inter_T_Path=Inter_C_Path−Inter_FR_Path, and Intra_T_Path=Intra_C_Path−Intra_FR_Path). In addition, final OIS 2D translation information Final T_Path is extracted by cumulatively adding the inter-frame OIS 2D translation information Inter_T_Path.

The intra-frame OIS 2D translation information Intra_T_Path obtained here is utilized for rolling shutter correction of an image (to correct pixel movement according to shutter movement) together with the intra-frame camera rotation information Intra_C_Path.

A specific operation will be described in detail with reference to drawings from FIG. 5 through FIG. 11.

The camera path optimizer 250 calculates stabilized camera motion information S, which is a path along which the camera module 100 itself has moved, by referring to the OIS 2D translation information T_Path and the camera rotation information C_Path. The camera path optimizer 250 optimizes the camera rotation information C_Path by referring to the extracted OIS 2D translation information T_Path, the extracted intra-frame OIS 2D translation information Intra_T_Path and the intra-frame camera rotation information Intra_C_Path. This optimizing operation also includes correcting distortion due to the rolling shutter.

As for the rolling shutter, when the image sensor 110 is a CMOS sensor according to some embodiments, the image signal processor 201 may read out reflected light sequentially from an uppermost line to a lowermost line in a pixel array while the image sensor 110 is obtaining a raw image on a frame-by-frame basis. An operation in which the image sensor 110 reads out light on a line-by-line may be referred to as a rolling shutter operation.

That is, in a rolling shutter method, since light reflected from a subject enters the image sensor 110 at a different time for each line, image distortion may occur even within one frame due to a time difference of light. Distortion due to the rolling shutter operation is caused by both the camera rotation information C_Path and the OIS 2D translation information T_Path. Therefore, an image distorted by the rolling shutter operation may be corrected by utilizing the intra-frame camera rotation information Intra_C_Path and the intra-frame OIS 2D translation information Intra_T_Path.

The motion compensation calculator 260 determines the amount of motion compensation for an input frame image based on the intra-frame camera rotation information Intra_C_Path, the intra-frame OIS 2D translation information Intra_T_Path, the final OIS 2D translation information Final T_Path, the final camera rotation information Final C_Path, and the stabilized camera motion information S. That is, the motion compensation calculator 260 determines the amount of correction at each individual grid point of a frame image output from the image sensor 110 by reflecting, in the stabilized camera motion information S, the amount of rotation correction corresponding to the intra-frame camera rotation information Intra_C_Path due to the rolling shutter operation, the intra-frame OIS 2D translation information Intra_T_Path, the final camera rotation information Final C_Path, and the final OIS 2D translation information Final T_path.

When the stabilized camera motion information S is applied to the frame image, the position of each input pixel in the corrected frame image is calculated to exist within a changed boundary margin range. This will be described in detail with reference to FIG. 10 and FIG. 11.

The geometric distortion compensator 270 receives the amount of correction at each individual grid point calculated by the motion compensation calculator 260 as an input and performs digital image stabilization by applying (e.g., binning or interpolation) the amount of correction to the entire frame image output from the camera module 100.

Figure 4:
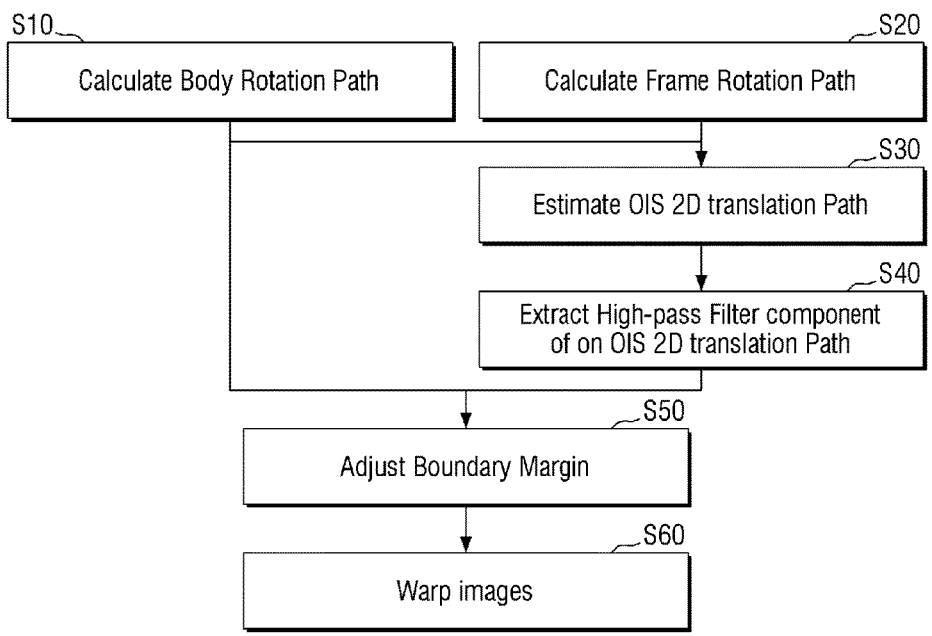
FIG. 4 is a flowchart illustrating an image stabilization method according to some embodiments of the present disclosure.

FIG. 4 is a flowchart illustrating an image stabilization method according to some embodiments of the present disclosure.

Referring to FIG. 4, the image signal processor 201 estimates the camera rotation information C_Path of the camera module 100 and the frame rotation information FR_Path based on gyro data and motion vector information or frame rotation data, each including time information, that is, a timestamp.

Specifically, the image signal processor 201 may estimate the final camera rotation information Final C_Path by calculating motion information of the camera module 100 and the amount of change in rotation angle between time t1 and time t2 based on first gyro data (Gyro angle_t1, Gyro timestamp_t1) and second gyro data (Gyro angle_t2, Gyro timestamp_t2) and cumulatively adding them up (operation S10). The estimated camera rotation information C_Path includes the intra-frame camera rotation information Intra_C_Path, the inter-frame camera rotation information Inter_C_Path, and the final camera rotation information Final C_Path. The camera rotation information C_Path may also be referred to as 3D (e.g., x-, y-, z-axis) position change information of the gyro sensor 153 based on a timestamp, that is, as rotational displacement of the camera module 100. For example, the final camera rotation information Final C_Path may be calculated by cumulatively adding the inter-frame camera rotation information Inter_C_Path.

The image signal processor 201 may estimate feature point motion information of an object, that is, the frame rotation information FR_Path between the time t1 and the time t2 based on first frame data (Frame_t1, Frame timestamp_t1) at the time t1 and second frame data (Frame_t2, Frame timestamp_t2) at the time t2 through the frame angular velocity sensor 151 and the motion vector module 210 (operation S20). Here, the frame rotation information FR_Path includes the intra-frame frame rotation information Intra_FR_Path, the inter-frame frame rotation information Inter_FR_Path, and the final frame rotation information Final FR_Path. The final frame rotation information Final FR_Path may be calculated by cumulatively adding the inter-frame frame rotation information Inter_FR_Path.

The image signal processor 201 extracts the OIS 2D translation information T_Path from the camera rotation information C_Path and the frame rotation information FR_Path (operation S30). Specifically, the OIS 2D translation information T_Path may be estimated by multiplying an angle change value obtained by subtracting the frame rotation information FR_Path from the camera rotation information C_Path by a converted focal length of the image sensor 110 in the camera module 100. The OIS 2D translation information T_Path may include the inter-frame OIS 2D translation information Inter_T_Path, the intra-frame OIS 2D translation information Intra_T_Path, and the final OIS 2D translation information Final T_Path. For example, the inter-frame OIS 2D translation information Inter_T_Path may be estimated based on the inter-frame camera rotation information Inter_C_Path and the inter-frame frame rotation information Inter_FR_Path, and the intra-frame OIS 2D translation information Intra_T_Path may be estimated based on the intra-frame camera rotation information Intra_C_Path and the intra-frame 2D translation information Intra_T_Path. That is, the final OIS 2D translation information Final T_Path may be calculated by cumulatively adding the inter-frame OIS 2D translation information Inter_T_Path.

The image signal processor 201 removes bias values mixed in the estimated OIS 2D translation information T_Path in order to increase estimation accuracy (operation S40). The bias values are offset values of the frame angular velocity sensor 151 or the gyro sensor 153. The offset values may appear as low-frequency components when the final OIS 2D translation information Final T_Path is estimated by integrating the inter-frame OIS 2D translation information Inter_T_Path. Since the final OIS 2D translation information Final T_Path cannot have a value larger than the size of an image, it should be considered, for more accurate estimation, that the offset values are included in the final OIS 2D translation path Final T_Path.

The image signal processor 201, that is, the OIS 2D translation information estimator 230 obtains a filtered OIS 2D translation path filtered_T_Path from which low-frequency components have been removed by applying a high-frequency filter to the final OIS 2D translation information Final T_Path estimated according to some embodiments. The OIS 2D translation information estimator 230 uses the filtered OIS 2D translation path filtered_T_Path in subsequent operations (operations S50 and S60). Here, the high-frequency filter may perform filtering based on an arbitrary threshold frequency, and the threshold frequency used as a filtering criterion is tunable. That is, low-frequency components may be removed from the final OIS 2D translation information Final T_Path based on a tuning threshold frequency, leaving only high-frequency components. Therefore, the image signal processor 201 estimates the stabilized camera motion information of the camera module by filtering the estimated OIS 2D translation information based on a tuning threshold frequency. In an embodiment, the high-frequency filter may be implemented as a 1-pole infinite impulse response (IIR) filter.

The camera path optimizer 250 may estimate the actual movement of the camera module 100, that is, the stabilized camera motion information S using the filtered OIS 2D translation information filtered_T_Path, the intra-frame OIS 2D translation information Intra_T_Path, and the camera rotation information C_Path. The camera rotation information C_Path used here may be the intra-frame camera rotation information Intra_C_Path and the final camera rotation information Final C_Path.

The image signal processor 201 may perform motion compensation on an input image based on the stabilized camera motion information S, the filtered OIS 2D translation information filtered_T_Path, the intra-frame camera rotation information Intra_C_Path, the intra-frame camera translation information Intra_T_Path, and the camera rotation path. For example, an image distorted by the rolling shutter operation may be corrected using the intra-frame camera rotation information Intra_C_Path and the intra-frame OIS 2D translation information Intra_T_Path extracted in operations S10 and S30. When the image signal processor 201 applies a preset boundary margin of the original input image (raw image) after the motion compensation, if the input image is moved beyond the preset boundary margin by the movement of the camera module 100 or the OIS 2D translation, a part of the input image which is outside the boundary margin may not be properly displayed (e.g., the part may be displayed as a blank screen (e.g., in black)). To prevent this phenomenon, the image signal processor 201 obtains the stabilized camera motion information S within a range that satisfies an adjusted boundary margin range (operation S50). The boundary margin adjustment will be described later with reference to FIG. 10 and FIG. 11.

Next, the image signal processor 201 completes digital image stabilization by applying final motion compensation information, which satisfies the boundary margin adjusted at S50, to a frame image in order to warp the frame image (operation S60). Motion compensation is performed on the sensed frame image according to the calculated final motion compensation information FIG. 5 is a conceptual diagram for explaining an image stabilization method according to some embodiments of the present disclosure.

The camera rotation information C_Path, the frame rotation information FR_Path, and the OIS 2D translation information T_Path will be described in more detail. If angular velocity r(t) measured between a first time t1 and a second time t2 is integrated with respect to time, it may be converted into a distance d(t2−t1) (i.e., $d(t2-t1)=\int_{t1}^{t2} r(t)dt$).

Referring to FIG. 5, the gyro-based motion estimator 240 extracts the camera rotation information C_Path, $\hat{r}_{gyro}$ from an output value (Gyro data, Gyro timestamp) of the gyro sensor 153. The motion vector-based motion estimator 220 extracts the frame rotation information FR_Path, $\hat{r}_{frame}$ from an output value (Frame data, Frame timestamp) or motion vector of the frame angular velocity sensor 151.

The camera rotation information C_Path is rotation information of the camera module 100 itself and may be calculated as camera rotation information ($\hat{r}_{gyro}$, A) obtained by comparing rotation information at the time t1 (Gyro timestamp_t1) and rotation information at the time t2 (Gyro timestamp_t2) based on timestamp information of the gyro sensor 153. The frame rotation information FR_Path utilizes rotation information between a previous frame and a current frame of a sensed image. That is, the frame rotation information FR_Path may be calculated as frame-converted rotation $\hat{r}_{frame}$ by comparing the rotation information at the time t1 (Frame timestamp_t1) and the rotation information at the time t2 (Frame timestamp_t2) of the same object (e.g., feature point) based on timestamp information of a frame sensor. Here, the time t1 and the time t2 are different time points of timestamps issued at preset cycles.

Here, each of the camera rotation information C_Path and the frame rotation information FR_Path may include final camera rotation information Final C_Path or the final frame rotation information Final FR_Path obtained by cumulatively adding the inter-frame camera rotation information Inter_C_Path or the inter-frame frame rotation information Inter_FR_Path between different frames, and inter-frame motion, the intra-frame camera rotation information Intra_C_Path or the intra-frame frame rotation information Intra_FR_Path within the same frame. According to some embodiments, a frame angular velocity sensor timestamp (Frame timestamp) and a gyro sensor timestamp (Gyro timestamp) may have the same period, different periods, or a period of a predetermined multiple.

The final frame rotation information Final FR_Path refers to frame rotation B estimated when a final result position ($\hat{r}_{gyro}+\vec{t}_{ois}$), which is a combination of the final camera rotation information Final C_Path, $\hat{r}_{gyro}$ and the final OIS 2D translation information Final T_Path, $\vec{t}_{ois}$, is converted into rotational motion in consideration of angular velocity only. In reality, a frame image in the camera module 100 moves according to the final camera rotation information Final C_Path, $\hat{r}_{gyro}$. A and then moves to position B' by moving in parallel according to the final OIS 2D translation information Final T_Path, $\vec{t}_{ois}$. However, if the final OIS 2D translation information Final T_Path, $\vec{t}_{ois}$ is not provided from a sensor to the image signal processor 201, current frame rotation information is simply based on position B estimated in consideration of only rotation $\hat{r}_{frame}$ of a motion vector MV.

A final image output from the image signal processor 201 is corrected based on stabilized camera rotation information $\hat{r}$ that simultaneously considers the camera rotation information C_Path and the OIS 2D translation information T_Path in an input image before correction. If image stabilization is performed based on only the frame rotation information $\hat{r}_{frame}$ without using the OIS 2D translation information $\vec{t}_{ois}$, B', wobbling may appear in an output frame image. Here, the camera rotation information C_Path to be stabilized refers to a final camera rotation path $\theta_{gyro}$ of Equation 1 calculated by cumulatively adding the inter-frame camera rotation information Inter_C_Path.

Therefore, the image signal processor 201 may calculate the position B' instead of position B by estimating the OIS 2D translation information $\vec{t}_{ois}$, T_Path from the camera rotation information C_Path and the frame rotation information FR_Path even when the OIS 2D translation information T_Path is not provided. In addition, the image signal processor 201 may use the estimated OIS 2D translation information T_Path to calculate stabilized camera rotation information Optimized C_Path, thereby performing digital image stabilization more accurately.

$$T \alpha f^*(\theta_{gyro} - \theta_{frame})$$

$$T_x = (\theta_{y_{gyro}} - \theta_{y_{frame}})^* f$$

$$T_y = -(\theta_{x_{gyro}} - \theta_{x_{frame}})^* f \qquad (1)$$

Where
$T_x, T_y$: x,y axis 2D Translation Path with OIS
$\theta_{x\_frame}, \theta_{y\_frame}$: x,y axis rotation path of frame
$\theta_{x\_gyro}, \theta_{y\_gyro}$: x,y axis rotation path of body
f: focal length Specifically, referring to Equation 1, the OIS 2D translation information T_Path (T in Equation 1) is proportional to an angle value $(\theta_{gyro} - \theta_{frame})$ obtained by subtracting the frame rotation information $\hat{r}_{frame}$ from the camera rotation information $\hat{r}_{gyro}$. Here, $\theta_{gyro}$ of Equation 1 is the final camera rotation information Final C_Path calculated by cumulatively adding the inter-frame camera rotation information Inter_C_Path, and $\theta_{frame}$ is the final frame rotation information Final FR_Path calculated by cumulatively adding the inter-frame frame rotation information Inter_FR_Path.

In addition, in Equation 1, intra-frame x-axis and y-axis rotation values of OIS 2D translation may be calculated by applying intra-frame x-axis and y-axis rotation values of frame-converted rotation estimated by the frame angular velocity sensor 151 to $\theta_{frame}$ and applying intra-frame x-axis and y-axis rotation values of camera rotation estimated from camera angular velocity to $\theta_{gyro}$.

An x-axis motion path $T_x$ of the OIS 2D translation information T_Path may be obtained as a value calculated by multiplying an angle value $(\theta_{y_{gyro}} - \theta_{y_{frame}})$, obtained by subtracting frame rotation information $\hat{r}_{MV}, \theta_{x\_frame}$ from camera rotation information $\theta_{y_{gyro}}, \hat{r}_{gyro}$, by a converted focal length f of the lens assembly 101. A y-axis motion path $T_y$ of the OIS 2D translation information T_Path may be obtained as a value calculated by multiplying an angle value $(\theta_{x_{gyro}} - \theta_{x\_frame})$, obtained by subtracting frame rotation information from camera rotation information $\theta_{x_{gyro}}, \hat{r}_{gyro}$, by the converted focal length f of the lens assembly 101. According to some embodiments, when an upper left corner is set as reference coordinates (0, 0), coordinates of an OIS motion image may be considered to have moved in an opposite direction. Therefore, calculated values may be assigned a 'minus (−)' sign, but may also be assigned a 'plus (+)' sign depending on the position of the reference coordinates.

According to some embodiments, the OIS 2D translation information estimator 230 may estimate the final OIS 2D translation information Final T_Path as described above.

Figure 6:
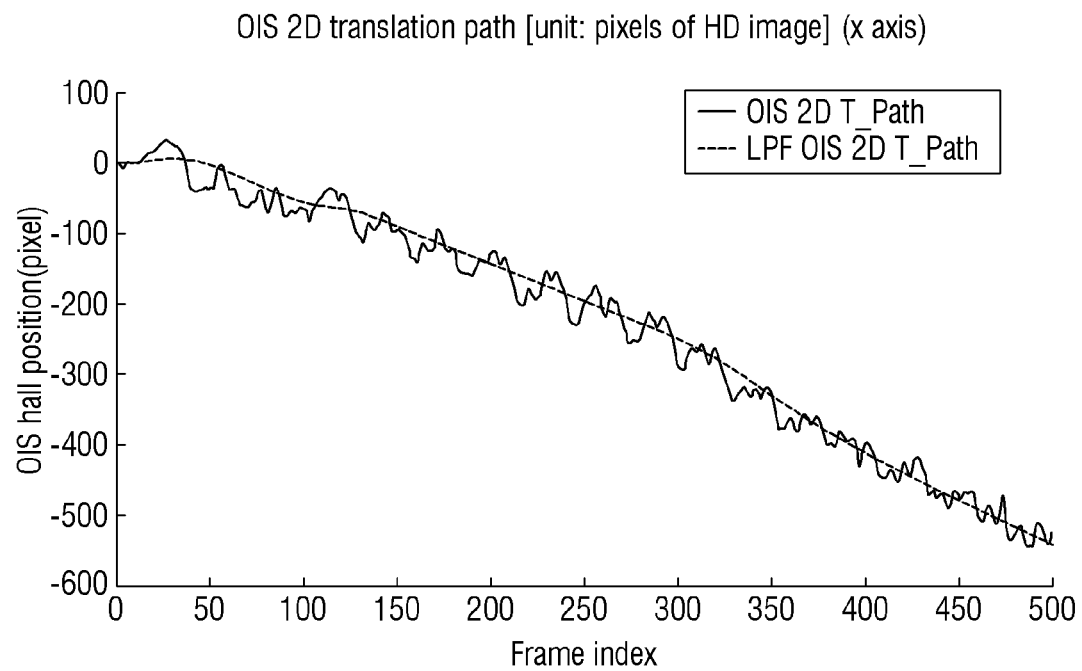
FIG. 6 is a graph illustrating an x-axis frequency component of OIS 2D translation information, according to some embodiments of the present disclosure.

FIG. 6 is a graph illustrating an x-axis frequency component of OIS 2D translation information, according to some embodiments of the present disclosure.

The image signal processor 201 may apply a high-frequency filter to the final OIS 2D translation information Final T_Path. The final OIS 2D translation information illustrated in FIG. 6 is an OIS translation path obtained by cumulatively adding inter-frame OIS 2D translation values.

The OIS 2D translation information T_Path, that is, a movement path cannot actually deviate from the size of an image received from the image sensor 110. However, the OIS 2D translation information T_Path includes not only gyro data used for OIS motion estimation but also a bias value (i.e., an offset value) generated during creation of frame data. If the final OIS 2D translation information Final T_Path is calculated and used for digital image stabilization without removal of the bias value, a stabilized image that is finally output may go outside a boundary margin of a sensed frame image size, and thus a part of the stabilized image may not be shown. Therefore, in order to remove the bias value when calculating the final OIS 2D translation information Final T_path, the image signal processor 201 may apply a high-frequency filter to the final OIS 2D translation information Final T_Path.

A threshold frequency of the high-frequency filter is tunable. In input image data, a high frequency band higher than the threshold frequency is passed, and a low frequency band lower than the threshold frequency is filtered out. To remove only a bias component and leave a high-frequency component with almost no loss, the tuning threshold frequency must be set appropriately. For ease of description, OIS 2D translation information including a bias component will be referred to as raw OIS 2D translation information raw T_Path, and OIS 2D translation information having the bias component removed will be referred to as filtered OIS 2D translation information filtered T_Path.

According to some embodiments, the high-frequency filter may use a 1-pole IIR filter. As a result, as illustrated in FIG. 6, a low-frequency component may be extracted from the raw OIS 2D translation information raw T_Path.

Figure 7:
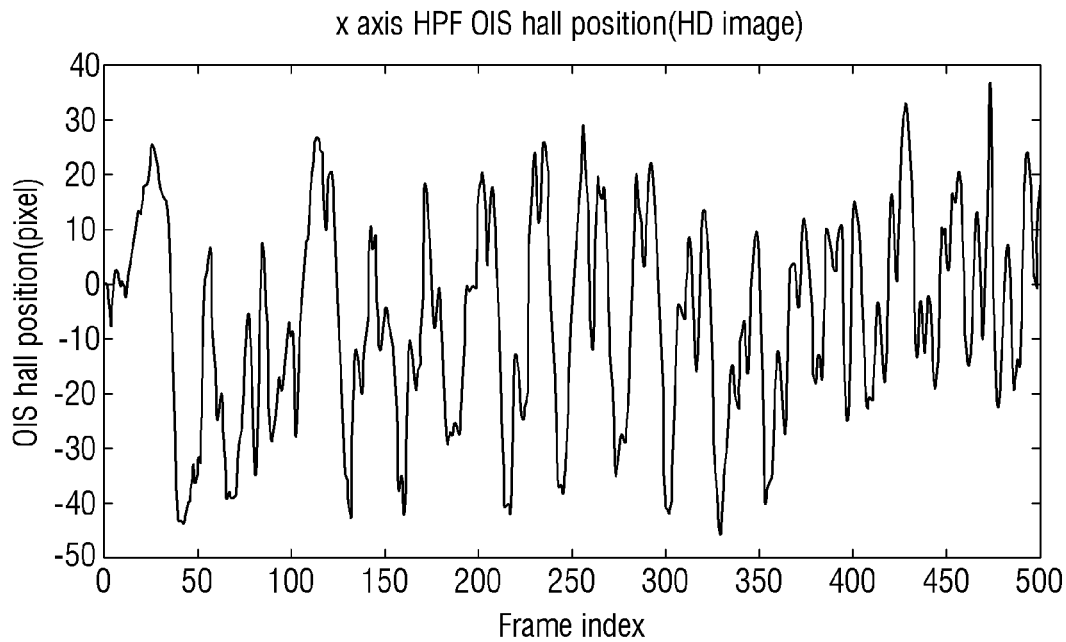
FIG. 7 is a graph illustrating an x-axis final high-frequency component of motion information for an image, according to some embodiments of the present disclosure.
Figure 8:
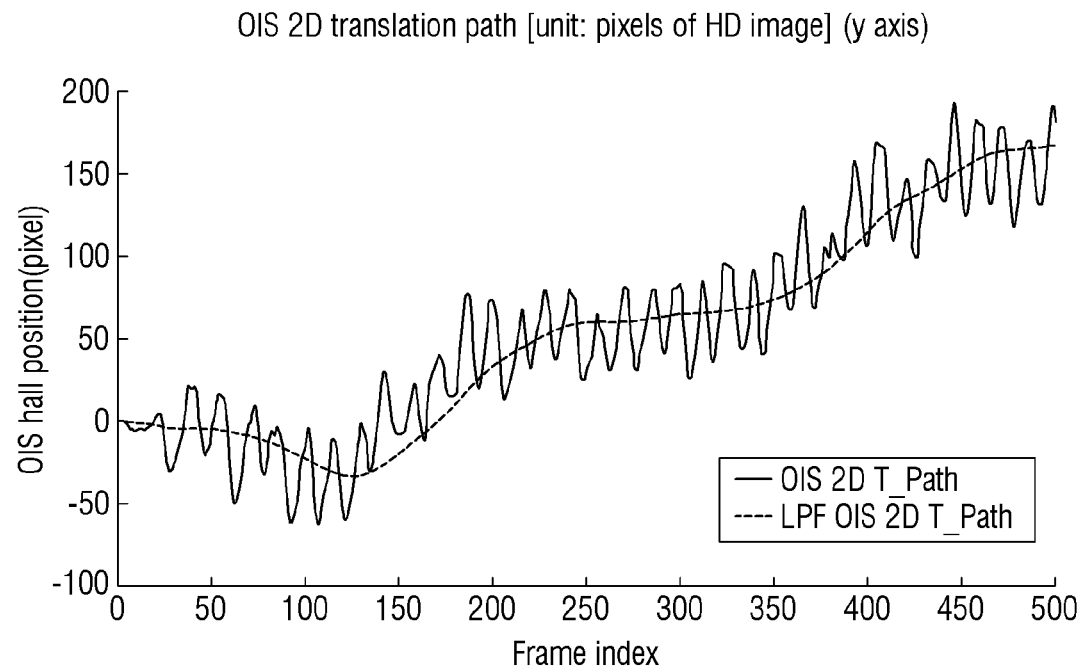
FIG. 8 is a graph illustrating a y-axis component in which a low-frequency component and a high-frequency component coexist in FIG. 7.
Figure 9:
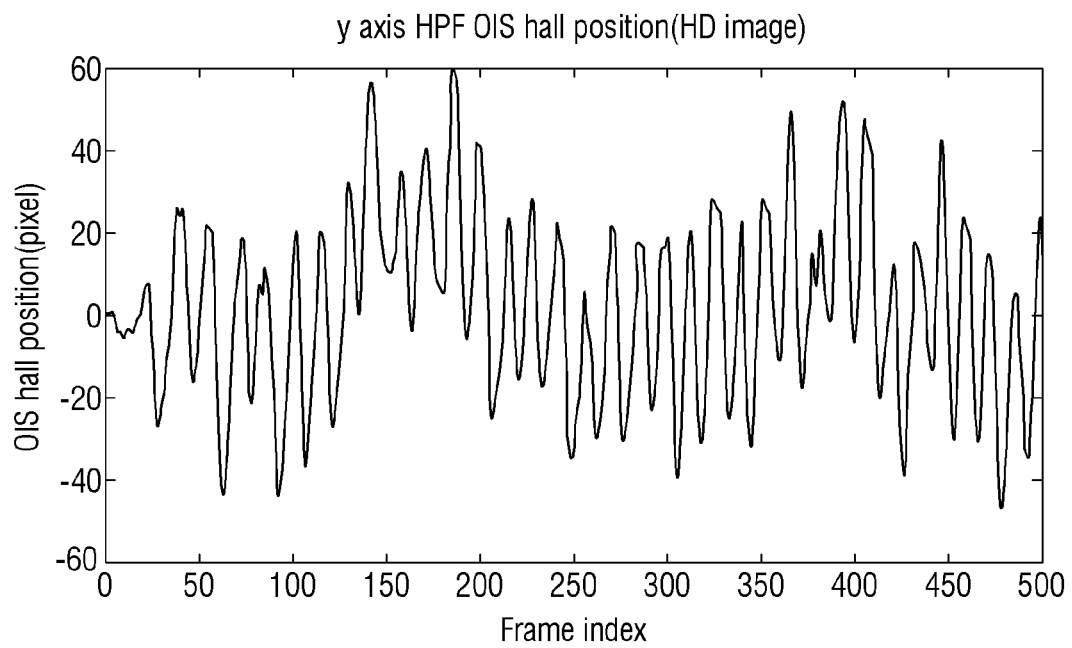
FIG. 9 is a graph illustrating the y-axis high-frequency component left after the removal of the low-frequency component from the y-axis movement of FIG. 8, according to some embodiments of the present disclosure.

FIG. 7 is a graph illustrating an x-axis final high-frequency component of motion information for an image, according to some embodiments of the present disclosure. FIG. 8 is a graph illustrating a y-axis component in which a low-frequency component and a high-frequency component coexist in FIG. 7. FIG. 9 is a graph illustrating the y-axis high-frequency component left after the removal of the low-frequency component from the y-axis movement of FIG. 8, according to some embodiments of the present disclosure.

For example, as illustrated in FIG. 6, x-axis raw OIS 2D translation information Raw T_Path may include a low-frequency component. When the low-frequency component is filtered out, an x-axis filtered OIS 2D translation information filtered T_Path including only a high-frequency component may be obtained as illustrated in FIG. 7.

For example, as illustrated in FIG. 8, y-axis raw OIS 2D translation information Raw T_Path may include a low-frequency component. When the low-frequency component is filtered out, y-axis filtered OIS 2D translation information filtered T_Path, $\hat{T}_{ois,HPF}$ including only a high-frequency component may be obtained as illustrated in FIG. 9.

Accordingly, the filtered OIS 2D translation information filtered T_Path of the x-axis and the y-axis from which a bias component has been removed may include more accurate OIS motion (shift) information.

Referring back to FIG. 2 and FIG. 5, the image signal processor 201 may perform digital image stabilization based on the camera rotation information C_Path, $\hat{R}_{gyro}$ of the camera module 100 and the filtered OIS 2D translation information filtered T_Path, $\hat{T}_{ois,HPF}$. According to some embodiments, the camera path optimizer 250 may optimize the camera rotation information C_Path by reflecting the filtered OIS 2D translation information filtered T_Path, $\hat{T}_{ois,HPF}$.

The image signal processor 201 should perform digital image stabilization in consideration of motion information based on 3D spatial coordinates for a frame image captured with 2D image coordinates. An input frame image is captured as a result of reflecting the camera rotation information C_Path, $\hat{R}_{gyro}$ of the camera module 100 and the OIS 2D translation information T_Path, $\vec{t}_{ois}$. Therefore, in the digital image stabilization, the stabilized camera rotation information Optimized C_Path, $\tilde{R}$ should be produced to satisfy a changed boundary margin range (see FIG. 11 and FIG. 12) when the camera rotation information C_Path and the filtered OIS 2D translation information filtered T_Path, $\hat{T}_{ois,HPF}$ are reflected.

Specifically, the motion of an image (an input frame image) before image stabilization for handshake stabilization is a combination of the camera rotation information $\hat{R}_{gyro}$, the intra-frame camera rotation information $\hat{R}_{RS}$, the filtered OIS 2D translation information filtered T_Path, $\hat{T}_{ois,HPF}$, and the intra-frame OIS translation information Intra_T_Path and thus may be calculated as in Equation 2.

$$\hat{P} = -\hat{T}_{RS}\hat{T}_{ois}K\hat{R}_{RS}\hat{R}_{gyro}P$$

$$\hat{T}_{ois,HPF} \approx \begin{pmatrix} 1 & 0 & T_x \\ 0 & 1 & T_y \\ 0 & 0 & 1 \end{pmatrix}$$

$\hat{P}$: input image homogenous coordinate
K: camera intrinsic projection matrix
$\hat{T}_{RS}$: intra-frame OIS translation matrix
$\hat{T}_{ois,HPF}$: HPF component of OIS 2D T_Path matrix
$\hat{R}_{RS}$: intra-frame camera rotation matrix
$\hat{R}_{gyro}$: the raw body rotation matrix given by gyro
    . . . (2).

That is, pixel coordinates $\hat{P}$ in an input frame image are obtained as a result of applying the camera rotation information $\hat{R}_{gyro}$ of the camera module 100 to a point P in a 3D world coordinate system, converting the result into a pixel coordinate system by multiplying the result by an intrinsic projection matrix K of the camera module 100, and then applying the filtered OIS 2D translation information filtered T_Path, $\hat{T}_{ois,HPF}$. Here, distortion due to the rolling shutter is corrected by reflecting the intra-frame camera rotation information Intra_C_Path and the intra-frame 2D translation information Intra_T_Path. Therefore, an image distorted by the rolling shutter operation may be corrected by utilizing the intra-frame camera rotation information Intra_C_Path and the intra-frame OIS 2D translation information Intra_T_Path extracted in operations S10 and S30 in FIG. 4.

The camera rotation information $\hat{R}_{gyro}$ is a value representing the final camera rotation information Final C_Path, which is calculated by cumulatively adding the inter-frame camera rotation information Inter_C_Path to be stabilized, as a rotation matrix.

Here, the filtered OIS 2D translation information filtered T_Path, $\hat{T}_{ois,HPF}$ may be a 3×3 matrix that considers both an x-axis shift value Tx and a y-axis shift value Ty according to some embodiments, and the camera intrinsic projection matrix may be as shown in Equation 3.

$$K = \begin{pmatrix} f & 0 & W/2 \\ 0 & f & H/2 \\ 0 & 0 & 1 \end{pmatrix} \quad (3)$$

Equation 3 represents a transformation relationship matrix K, that is, a projection matrix between a point P(x,y,z) in the world coordinate system and a 2D pixel coordinate point formed after the above point is projected by a camera sensor. In addition, f is a converted focal length, and (W, H) is the number of horizontal and vertical pixels of an input image frame. If the image pixel coordinate center is set to (W/2, H/2) for ease of calculation, Equation 3 is changed to Equation 4 below.

$$K = \begin{pmatrix} f & 0 & 0 \\ 0 & f & 0 \\ 0 & 0 & 1 \end{pmatrix} \quad (4)$$

A final image after digital image stabilization may be calculated as in Equation 5. A pixel coordinate value $\tilde{P}$ of a stabilized image may be calculated by reflecting the stabilized camera rotation information $\tilde{R}$ of the camera module in a point P of the 3D world coordinate system and then applying the camera intrinsic projection matrix to the reflection result.

$$\tilde{P} = K\tilde{R}P \quad (5)$$

$\tilde{P}$: output pixel coordinate
$\tilde{R}$: desired final stabilized camera rotation orientation
K: camera intrinsic projection matrix.

As in Equation 6, coordinates $\hat{P}$ of an input frame image with respect to coordinates $\tilde{P}$ of a final frame image may be calculated by converting the coordinates $\tilde{P}$ into the world coordinate system (3D coordinate system) ($K^{-1}\tilde{P}$) using a backward warping method, reflecting a difference between a stabilized path and a raw path, that is, a camera correction rotation value $\hat{R}_{gyro}\tilde{R}^{-1}$, $\theta_{x,y,z}$, and then reflecting OIS 2D translation information. Here, the intra-frame camera rotation information Intra_C_Path and the intra-frame 2D translation information Intra_T_Path are reflected to correct the rolling shutter effect.

Equation 6 is a result of applying Equation 4 and Equation 5 to Equation 2. That is, the final frame image $\tilde{P}$ may be calculated as a projection translation matrix $-\hat{T}_{RS}\hat{T}_{ois,HPF}K\hat{R}_{RS}\hat{R}_{gyro}\tilde{R}^{-1}K^{-1}$ reflected in the input frame image $\hat{P}$.

$$\hat{P} = -\hat{T}_{RS}\hat{T}_{ois,HPF}K\hat{R}_{RS}\hat{R}_{gyro}\tilde{R}^{-1}K^{-1}\tilde{P} \quad (6)$$

$\hat{P}$: input pixel coordinate
$\hat{T}_{ois,HPF}$: HPF component of OIS translation matrix
K: camera intrinsic projection matrix
$\hat{R}_{gyro}$: the raw camera rotation matrix given by gyro
P: output pixel coordinate.

According to some embodiments, the camera path optimizer 250 estimates the stabilized camera rotation information $\hat{R}$ (Optimized C_Path).

Figure 10:
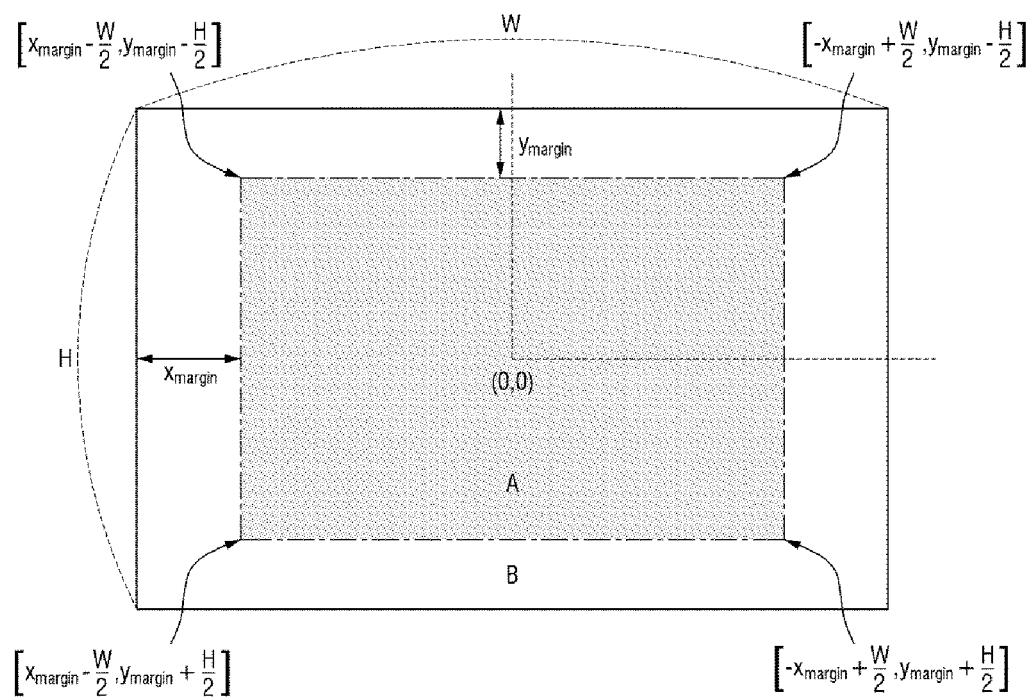
FIG. 10 is a graph illustrating an input pixel position range of a crop point of a final image before OIS compensation is applied, according to some embodiments of the present disclosure.
Figure 11:
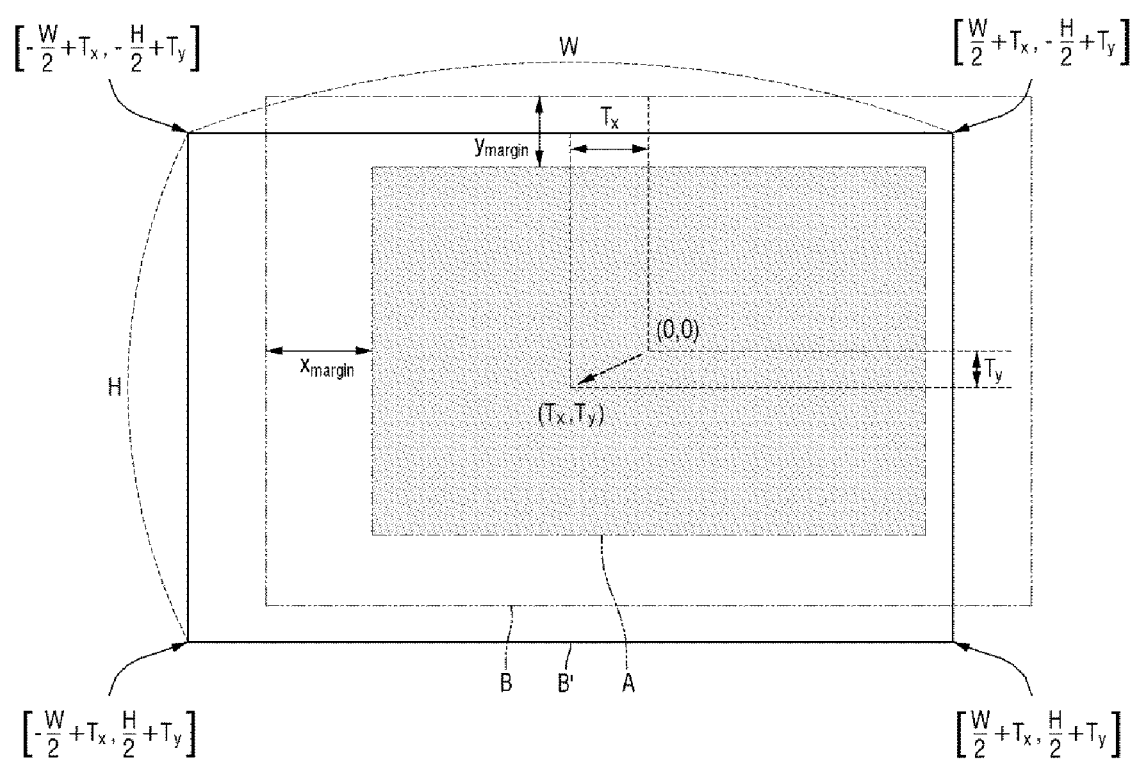
FIG. 11 is a diagram for explaining parallel movement of the input pixel position range by the amount of OIS compensation in response to rotational motion after OIS compensation is applied.

FIG. 10 is a graph illustrating an input pixel position range of a crop point of a final image before OIS compensation is applied, according to some embodiments of the present disclosure. FIG. 11 is a diagram for explaining parallel movement of the input pixel position range by the amount of OIS compensation in response to rotational motion after OIS compensation is applied, according to some embodiments of the present disclosure.

When OIS optical correction is applied, the image signal processor 201 adjusts a boundary margin range for correction of the camera rotation C_Path by the amount of OIS optical correction in an image captured by the image sensor 110. Referring to FIG. 10, although an actual captured image before OIS optical correction is applied is area B, a final image output after being processed is cropped to show only area A. That is, the actual captured image B is finally output after both sides in a first direction are each cropped from the inside of the boundary toward center coordinates (0, 0) of the image by Xmargin and after both sides in a second direction are each cropped from the inside of the boundary by Ymargin. Here, an area between the boundary of the area A which is output and the boundary of the area B which is the actual captured image is referred to as a boundary margin.

Specifically, referring to FIG. 10 and Equation 7, when there is no correction for OIS 2D translation, that is, when $T_x=T_y=0$ in Equation 7, input pixels captured by the camera module 100 are in the area B, and what is cropped and output after image stabilization is an image of the area A. That is, the area B that is actually captured is captured with a width W and a height H, and the area A that is output after image stabilization is obtained by cropping both sides of the area B toward the image center (0, 0) by $x_{margin}$ and $y_{margin}$ in a horizontal direction and a vertical direction, respectively. Coordinates of vertices of the area A that is output may be calculated as in Equation 7.

$$P = \left[ x_{margin} - \frac{w}{2}, y_{margin} - \frac{H}{2}, 1 \right]^T \quad (7)$$

$$\left[ x_{margin} - \frac{w}{2}, -y_{margin} + \frac{H}{2}, 1 \right]^T$$

$$\left[ -x_{margin} + \frac{w}{2}, y_{margin} - \frac{H}{2}, 1 \right]^T$$

-continued $$\left[ -x_{margin} + \frac{w}{2}, y_{margin} + \frac{H}{2}, 1 \right]^T$$

P: output pixel coordinate.

However, the center coordinates of the captured image are moved from (0, 0) to (Tx, Ty) due to motion correction based on camera rotation or OIS 2D translation. That is, coordinates of vertices of the area B of FIG. 10 are moved to coordinates of vertices of area B' of FIG. 11.

In this case, when the positions of input pixels of the cropped area A are within the motion-corrected area B' (moved within the boundary margin), an output image may be normally output without a cropped part. However, if the input pixels of the cropped area A are outside the area B' (outside the boundary margin), a part of the output image which is outside the area B' is shown in black. Therefore, when an input image is shifted (B→B') by optical correction, the boundary margin of the copped area A should also be changed (right side of Table 1).

A correctable range $\theta_{x,y,z}$ of camera rotation, that is, as described in FIG. 10 and FIG. 11, a boundary margin condition (left side of Table 1) before motion correction, is changed to a boundary margin (right side of Table 1) after motion correction including Tx and Ty information.

TABLE 1

| Before OIS 2D T_path | After OIS 2D T_path |
|---|---|
| $-\dfrac{w}{2} \leq \dfrac{P_x - \theta_x P_y + f\theta_y P_z}{-\dfrac{\theta_y}{f}P_x + \dfrac{\theta_x P_y}{f}P_y + P_z} \leq \dfrac{w}{2}$ | $-\dfrac{w}{2} \leq \dfrac{P_x - \theta_x P_y + f\theta_y P_z}{-\dfrac{\theta_y}{f}P_x + \dfrac{\theta_x P_y}{f}P_y + P_z} - T_x \leq \dfrac{w}{2}$ |
| $-\dfrac{H}{2} \leq \dfrac{\theta_z P_x + P_y - f\theta_x P_z}{-\dfrac{\theta_y}{f}P_x + \dfrac{\theta_x P_y}{f}P_y + P_z} \leq \dfrac{H}{2}$ | $-\dfrac{H}{2} \leq \dfrac{\theta_z P_x + P_y - f\theta_x P_z}{-\dfrac{\theta_y}{f}P_x + \dfrac{\theta_x P_y}{f}P_y + P_z} - T_y \leq \dfrac{H}{2}$ |

$\theta_{x,y,z}$: warping rotation angle x, y, z of body

For example, an image warping angle ($\theta_{x,y,z}$) for rotation stabilization is a difference value between the stabilized camera rotation information ($\hat{R}$), which is obtained by reflecting the camera rotation information C_Path regarding camera rotation and the OIS 2D translation information T_Path regarding a lens or sensor shift, and the camera rotation information ($R_{gyro}$), and may be approximated to a transformation matrix, for example, Rodrigues's rotation matrix as in Equation 8.

$$\hat{R}_{gyro}\hat{R}^{-1} \approx \begin{pmatrix} 1 & -\theta_y & \theta_y \\ \theta_z & 1 & -\theta_x \\ -\theta_y & \theta_x & 1 \end{pmatrix} \quad (8)$$

$\theta_{x,y,z}$: warping rotation angle x, y, z of body.

According to some embodiments, the motion compensation calculator 260 may generate a transformation matrix (e.g., Equation 8) and apply the transformation matrix to an input frame image.

According to some embodiments, the geometric distortion compensator 270 receives a grid change value of each pixel, to which motion correction has been applied, from the motion compensation calculator 260, reflects the grid change value in the entire input frame image through digital processing such as binning or interpolation, and outputs a final frame image.

Therefore, the electronic device of the present disclosure, including the camera module 100 in which a lens or an image sensor is shifted, may obtain camera rotation information and frame rotation information from sensors and perform image stabilization by calculating OIS 2D translation information from motion vector module values or sensing output values of the sensors even if there is no OIS motion information. Accordingly, when both the camera rotation information and the frame rotation information are obtained from the sensors, it is possible to output a stabilized image without wobbling, even in a low-illuminance environment or a case where a background lacking repeating patterns or feature points occupies most of the screen, by performing optical and digital image stabilization.

FIG. 12 is a block diagram illustrating an electronic device 1101 in a network environment 1100 according to some embodiments of the present disclosure.

Referring to FIG. 12, the electronic device 1101 in the network environment 1100 may communicate with an electronic device 1102 via a first network 1198 (e.g., a short-range wireless communication network) or with an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, a memory 1130, an input device 1150, a sound output device 1155, a display device 1160, an audio module 1170, a sensor module 1176, an interface 1177, a haptic module 1179, a camera module 100, a power management module 1188, a battery 1189, a communication module 1190, a subscriber identification module 1196, and an antenna module 1197. In some embodiments, at least one of the components (e.g., the display device 1160 or the camera module 100) may be omitted from the electronic device 1101, or one or more other components may be added to the electronic device 1101. In some embodiments, some of the components may be integrated. For example, the sensor module 1176 (e.g., a fingerprint sensor, an iris sensor, or an illuminance sensor) may be embedded in the display device 1160 (e.g., a display).

According to an embodiment, the processor 1120 may execute, for example, software (e.g., a program 1140) to control at least one other component (e.g., a hardware or software component) of the electronic device 1101 connected to the processor 1120 and may perform various data processing and computation. The processor 1120 may load a command or data received from another component (e.g., the sensor module 1176 or the communication module 1190) into a volatile memory 1132, process the command or the data loaded into the volatile memory 1132, and store result data in a non-volatile memory 1134. According to an embodiment, the processor 1120 may include a main processor 1121 (e.g., a central processing unit or an application processor) and an auxiliary processor 1123 (e.g., a graphics processing unit, an image signal processor, a sensor hub processor, or a communication processor) that is operated independently of the main processor 1121 and, additionally or alternatively, consumes less power than the main processor 1121 or is specialized for a specified function. The auxiliary processor 1123 may be implemented as separate from, or as part of the main processor 1121. Additionally, a processor as described herein may include a multi-core processor, wherein each core of the multi-core processor implements separate aspects of the functionality described herein by running threads of instructions programmed to execute the functionality described herein.

The auxiliary processor 1123 may control at least some of functions or states related to at least one component (e.g., the display device 1160, the sensor module 1176, or the communication module 1190) among the components of the electronic device 1101, instead of the main processor 1121 while the main processor 1121 is in an inactive (e.g., sleep) state or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 100 or the communication module 190) functionally related to the auxiliary processor 1123. The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software and may include, for example, an operating system 1142, middleware 1144, or an application 1146.

According to an embodiment, the input device 1150 may receive a command or data to be used by other components (e.g., the processor 1120) of the electronic device 1101 from the outside (e.g., a user) of the electronic device 1101. The input device 1150 may include, for example, a microphone, a mouse, or a keyboard.

According to an embodiment, the sound output device 1155 may output sound signals to the outside of the electronic device 1101. The sound output device 1155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

According to an embodiment, the display device 1160 may visually provide information to a user of the electronic device 1101. The display device 1160 may include, for example, a display, a hologram device, or a projector and control circuitry to control a corresponding one of the display, hologram device, and projector. According to an embodiment, the display device 1160 may include touch circuitry or a pressure sensor adapted to measure the intensity of force incurred by a touch.

According to an embodiment, the audio module 1170 may convert a sound into an electrical signal and vice versa. According to an embodiment, the audio module 1170 may obtain the sound via the input device 1150 or output the sound via the sound output device 1155 or an external electronic device (e.g., the electronic device 1102 (e.g., a speaker or a headphone)) wiredly or wirelessly connected to the electronic device 1101.

According to an embodiment, the sensor module 1176 may generate an electrical signal or data value corresponding to an operational state (e.g., power or temperature) of the electronic device 1101 or an environmental state external to the electronic device 1101. The sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

According to an embodiment, the interface 1177 may support a specified protocol to be used for the electronic device 1101 to be connected to the external electronic device (e.g., the electronic device 1102) wiredly or wirelessly. According to an embodiment, the interface 177 may include a high definition multimedia interface (HDMI), a universal serial bus (USB) interface, a secure digital (SD) card interface, or an audio interface.

According to an embodiment, a connecting terminal 1178 may include a connector via which the electronic device 1101 may be physically connected to the external electronic device (e.g., the electronic device 1102). For example, the connecting terminal 1178 may include a HDMI connector, a USB connector, a SD card connector, or an audio connector (e.g., a headphone connector).

According to an embodiment, the haptic module 1179 may convert an electrical signal into a mechanical stimulus (e.g., a vibration or a movement) or electrical stimulus which may be recognized by a user via his tactile sensation or kinesthetic sensation. The haptic module 1179 may include, for example, a motor, a piezoelectric element, or an electric stimulator.

According to an embodiment, the camera module 100 may capture still images and moving images. According to an embodiment, the camera module 100 may be configured and operated as described above with reference to FIGS. 1 through 11.

According to an embodiment, the power management module 1188 may manage power supplied to the electronic device 1101. The power management module 1188 may be implemented as at least a part of, for example, a power management integrated circuit (PMIC).

According to an embodiment, the battery 1189 may supply power to at least one component of the electronic device 1101. The battery 1189 may include, for example, a primary cell which is not rechargeable, a secondary cell which is rechargeable, or a fuel cell.

According to an embodiment, the communication module 1190 may support establishing a wired or wireless communication channel between the electronic device 1101 and the external electronic device (e.g., the electronic device 1102, the electronic device 1104, or the server 1108) and performing communication via the established communication channel. The communication module 1190 may include one or more communication processors that are operated independently of the processor 1120 (e.g., the application processor) and support wired communication or wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication module). Using a corresponding one of these communication modules, the communication module 1190 may communicate with the external electronic device via the first network 1198 (e.g., a short-range communication network such as Bluetooth, wireless-fidelity (Wi-Fi) direct, or infrared data association (IrDA)) or the second network 1199 (e.g., a long-range communication network such as a cellular network, the Internet, or a computer network (e.g., LAN or wide area network (WAN)). These various types of communication modules 1190 may be implemented as a single chip or may be implemented as multi chips separate from each other.

According to an embodiment, the wireless communication module 1192 may identify and authenticate the electronic device 1101 in a communication network using subscriber information stored in the subscriber identification module 1196.

According to an embodiment, the antenna module 1197 may include one or more antennas to transmit or receive a signal or power to or from the outside of the electronic device 1101. According to an embodiment, the communication module 1190 (e.g., the wireless communication module 1192) may transmit or receive a signal to or from the external electronic device via an antenna appropriate for a communication scheme.

At least some of the above-described components may be connected to each other to communicate signals (e.g., commands or data) between them via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the electronic device 1104 via the server 1108 connected to the second network 1199. That is, the electronic device 1104 may be external to the electronic device 1101, and may communication with the electronic device 1101 via intermediate network elements such as the server 1108. Each of the electronic devices 1102 and 1104 may be a device of the same type as or a different type from the electronic device 1101. According to an embodiment, all or some of operations to be executed by the electronic device 1101 may be executed by one or more external electronic devices. According to an embodiment, if the electronic device 1101 should perform a function or a service automatically or in response to a request, the electronic device 1101, instead of or in addition to executing the function or the service, may request an external electronic device to perform at least a part of the function or the service. The external electronic device receiving the request may perform the request part of the function or the service or an additional part and transfer an outcome of the performing to the electronic device 1101. The electronic device 1101 may provide the outcome, with or without further processing of the outcome, as a part of the function or the service requested. To that end, a cloud computing, distributed computing, or client-server computing technology may be used, for example.

As set forth above, an apparatus and method for performing digital image stabilization may be provided even in an electronic device that does not provide optical image stabilization (OIS) two-dimensional (2D) translation information. The digital image stabilization may be provided by more accurately reflecting the movement of the electronic device by estimating the OIS 2D translation information.

As also set forth above, an apparatus and method for more accurately compensating for a problem caused by handshake may be provided by appropriately performing digital image stabilization even in an electronic device that does not provide OIS 2D translation information. The digital image stabilization may be provided by optimizing rotation information of the electronic device.

However, aspects of the present disclosure are not restricted to those set forth herein.

While the present disclosure has been particularly shown and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:

1. An electronic device, comprising:
a camera module which generates and outputs gyro data and frame data for an input image; and
an image signal processor,
wherein the image signal processor comprises:
a motion vector module which calculates motion vector information;
a gyro-based motion estimator which extracts camera rotation information of the camera module from the gyro data;
a motion vector-based motion estimator which extracts frame rotation information from the frame data;
an optical image stabilization (OIS) two-dimensional (2D) translation information estimator which estimates OIS 2D translation information based on the motion vector information, the camera rotation information, and the frame rotation information; and
a camera path optimizer which filters out a low-frequency component from the OIS 2D translation information to produce filtered OIS 2D translation information, and calculates stabilized camera motion information of the camera module using the filtered OIS 2D translation information and the camera rotation information.

2. The electronic device of claim 1, wherein the OIS 2D translation information estimator calculates raw OIS 2D translation information by reflecting a converted focal length in a value obtained by subtracting the frame rotation information from the camera rotation information.

3. The electronic device of claim 2, wherein in filtering out the low-frequency component, a low-frequency component below a tuning threshold frequency is removed from the raw OIS 2D translation information.

4. The electronic device of claim 2, wherein the camera rotation information comprises intra-frame camera rotation information, inter-frame camera rotation information, and a final camera rotation path calculated by cumulatively adding the inter-frame camera rotation information.

5. The electronic device of claim 2, wherein the frame rotation information comprises intra-frame rotation information, inter-frame rotation information, and final frame rotation information calculated by cumulatively adding the inter-frame rotation information.

6. The electronic device of claim 1, wherein the camera path optimizer extracts final motion information based on the stabilized camera motion information, the filtered OIS 2D translation information, and the camera rotation information.

7. The electronic device of claim 6, wherein the final motion information is adjusted according to a boundary margin of the input image.

8. The electronic device of claim 6, further comprising a motion compensation calculator which calculates an amount of correction at each individual grid point of a frame image of the input image by reflecting an amount of rotation correction corresponding to intra-frame camera rotation information, intra-frame OIS 2D translation information, the camera rotation information and the OIS 2D translation information in the stabilized camera motion information.

9. The electronic device of claim 8, further comprising a distortion compensator which performs digital image stabilization by applying the amount of correction of the motion compensation calculator to an entirety of the frame image of the input image.

10. An electronic device comprising:
a camera module which outputs gyro data comprising at least two gyro sensing values and frame data comprising at least two frame images; and
an image signal processor,
wherein the image signal processor calculates camera rotation information and frame rotation information based on the gyro data, the frame data and motion vector information, estimates OIS 2D translation information based on the camera rotation information and the frame rotation information, estimates stabilized camera motion information of the camera module based on the estimated OIS 2D translation information, and compensates for final motion information calculated based on the stabilized camera motion information, the estimated OIS 2D translation information and the camera rotation information.

11. The electronic device of claim 10, wherein the estimated OIS 2D translation information is calculated by reflecting a converted focal length in a value obtained by subtracting the frame rotation information from the camera rotation information.

12. The electronic device of claim 11, wherein the image signal processor estimates the stabilized camera motion information of the camera module by filtering the estimated OIS 2D translation information based on a tuning threshold frequency.

13. The electronic device of claim 10, wherein the final motion information is obtained by adjusting motion information, which is obtained according to the stabilized camera motion information, the estimated OIS 2D translation information and the camera rotation information, according to a boundary margin of an input image.

14. The electronic device of claim 10, wherein the camera rotation information comprises intra-frame camera rotation information, inter-frame camera rotation information, and final camera rotation information obtained by cumulatively adding the inter-frame camera rotation information.

15. The electronic device of claim 14, wherein the frame rotation information comprises intra-frame rotation information, inter-frame rotation information, and final frame rotation information obtained by cumulatively adding the inter-frame rotation information.

16. The electronic device of claim 10, wherein the stabilized camera motion information is obtained by applying the camera rotation information to pixel coordinates of an input image and applying an intrinsic projection matrix of the camera module and the OIS 2D translation information.

17. An image stabilization method of an electronic device, the method comprising:
sensing a frame image and obtaining gyro data, frame data and motion vectors according to shaking of the electronic device;
extracting camera rotation information of the electronic device from the gyro data and extracting frame rotation information from the frame data and the motion vectors;
estimating raw OIS 2D translation information based on the camera rotation information and the frame rotation information;
calculating filtered OIS 2D translation information by removing a bias component from the raw OIS 2D translation information; and
performing digital image stabilization on the sensed frame image based on the filtered OIS 2D translation information.

18. The method of claim 17, wherein the raw OIS 2D translation information is a value estimated corresponding to a value obtained by subtracting the frame rotation information from the camera rotation information.

19. The method of claim 18, wherein the frame rotation information comprises inter-frame rotation information extracted between at least two frames, intra-frame rotation information extracted from one frame, and final frame rotation information obtained by cumulatively adding the inter-frame rotation information.

20. The method of claim 19, wherein the digital image stabilization comprises:
  estimating stabilized camera motion information of the electronic device based on the filtered OIS 2D translation information and the camera rotation information;
  calculating final motion information based on the stabilized camera motion information, the filtered OIS 2D translation information and the camera rotation information; and
  performing motion compensation on the sensed frame image according to the calculated final motion information.

* * * * *